J. P. PETIT.
AUTOMOBILE CRANKING MECHANISM.
APPLICATION FILED MAR. 3, 1911.
1,006,401.
Patented Oct. 17, 1911.
2 SHEETS—SHEET 1.
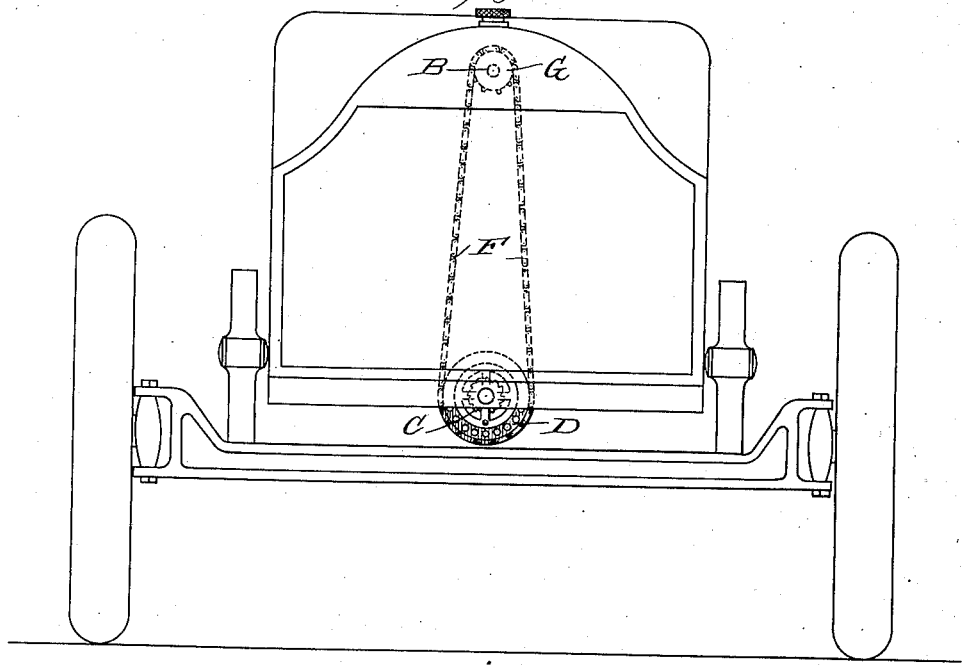
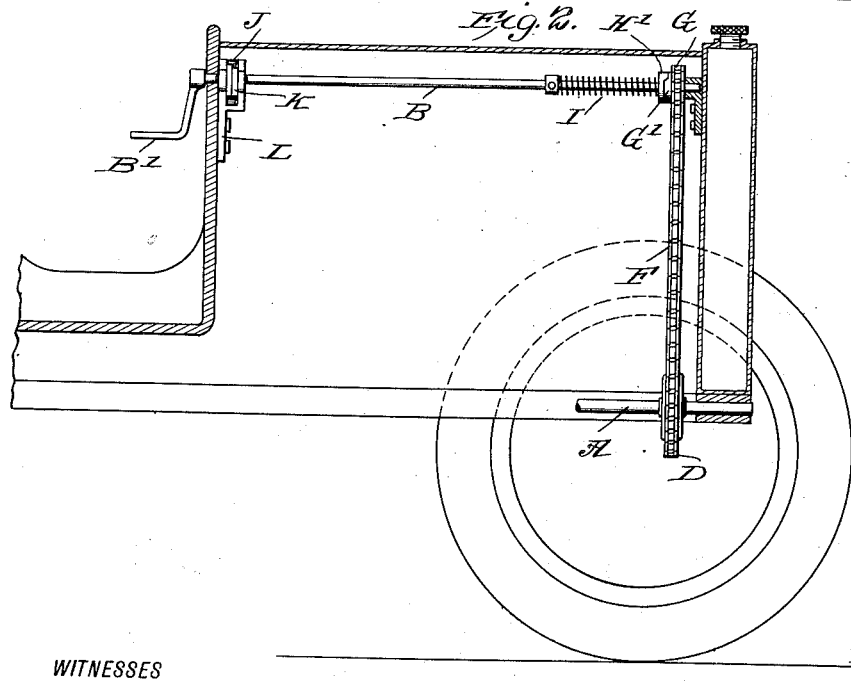
WITNESSES
INVENTOR
JOHN P. PETIT
BY
ATTORNEYS

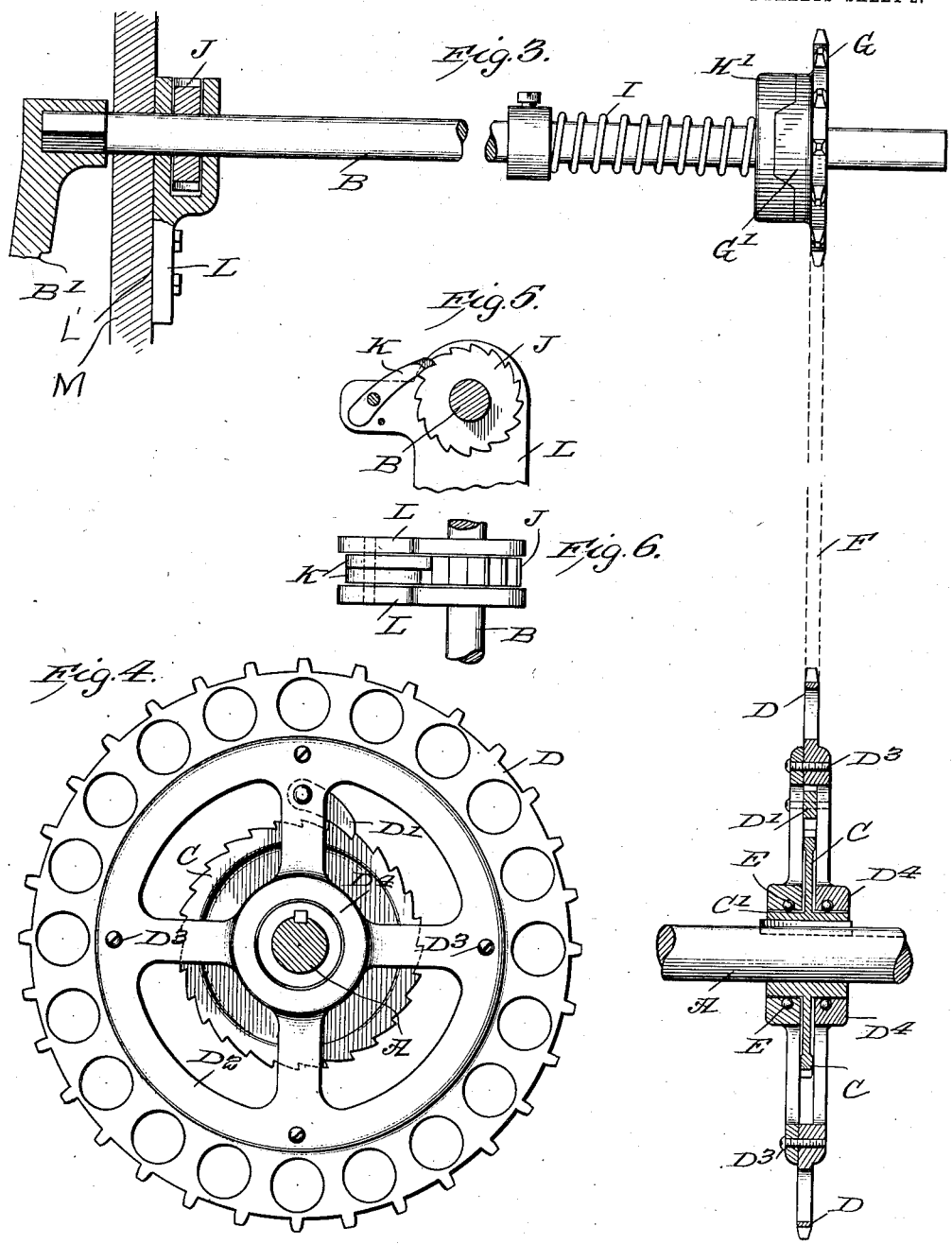

UNITED STATES PATENT OFFICE.

JOHN P. PETIT, OF SALEM, OREGON.

AUTOMOBILE CRANKING MECHANISM.

1,006,401.   Specification of Letters Patent.   Patented Oct. 17, 1911.

Application filed March 3, 1911. Serial No. 611,988.

*To all whom it may concern:*

Be it known that I, JOHN P. PETIT, a citizen of the United States, and a resident of Salem, in the county of Marion and State of Oregon, have invented certain new and useful Improvements in Automobile Cranking Mechanism, of which the following is a specification.

This invention is an improvement in cranking mechanism or devices used on automobiles, and has for an object to provide a simple, novel construction whereby the engine can be cranked from the driver's seat of the car in a perfectly safe manner, and by means of which will avoid the possibility of any injury to the driver by the action of the engine; and the invention consists in certain novel constructions and combinations of parts as will be hereinafter described and claimed.

In the drawings, Figure 1 is a front view of an automobile provided with my improvements. Fig. 2 is a vertical section of the front portion or engine case of the automobile with the improvements applied and shown in section. Fig. 3 is an enlarged section of the improved devices, parts being broken away. Fig. 4 is a front view of the sprocket and ratchet devices used on the engine shaft, and, Fig. 5 is a detail view of the sprocket and ratchet used in connecton with the starting shaft.

In the construction shown, I refer for convenience of reference, to the shaft A as the engine shaft, and to the shaft B as the starting shaft, this shaft being extended into convenient reach of the driver in the car, and is provided with a handle B', which may be of any desired construction, being shown as a crank.

The engine shaft A may be the ordinary shaft of any ordinary engine used in automobiles or the like and on this shaft is fixed a ratchet wheel C, which is engaged by a pawl D' on a sprocket wheel D. The pawl D' is preferably a gravity pawl so that it engages with the ratchet wheel by gravity and if at any time when the engine is operating, the click of the pawl is objectionable, the wheel D may be adjusted to throw the pawl D' below the ratchet C so the point of the pawl will drop clear of the ratchet wheel C.

As shown and as preferred, the ratchet wheel C is practically housed in the sprocket wheel D, the latter having a body portion D' and a removable cap D², which latter is secured to the body portion by screws D³ and may be removed or replaced as desired.

Suitable anti-friction bearings at E may be provided between the hub D⁴ of the sprocket wheel and the hub C' of the ratchet wheel C, as best shown in Fig. 3 of the drawings. By the described construction, the ratchet wheel C may be keyed to the engine shaft A and the sprocket wheel will operate by ball bearings upon the hub of the ratchet wheel and this sprocket wheel will operate through its pawl D' to transmit any motion which may be given it to the ratchet wheel and thence to the engine shaft E. At the same time, if the engine shaft moves more rapidly than the sprocket wheel, and during the operation of the engine, the ratchet wheel may be moved freely forward past the pawl D' as will be obvious from Fig. 4 of the drawings.

The sprocket wheel D is geared by a sprocket chain F with a sprocket wheel G which is loose on the starting shaft B and this sprocket wheel G has a clutch section G' which is engaged by a clutch section H' keyed to and movable along the starting shaft B and pressed normally into engagement with its coöperating clutch section G' by a spring I. The clutch sections constitute what might be termed slip clutches, the spring I having sufficient tension to hold the section H' so firmly in connection with the section G' as to turn the said section G' and through it the sprocket wheel G and the sprocket wheel D and other connected parts to the engine shaft, but in case of a back fire in the engine, the clutch section G' will slip back past the clutch section H, so that there will be at no time any danger of the handle B' of the starting shaft being operated by a back fire of the engine. This is further prevented by the provision of detent mechanism comprising a ratchet wheel J on the starting shaft B and engaged by a pawl K, which prevents any reverse movement of the starting shaft and locks the said shaft firmly against any backward movement so that in case of a reverse movement of the starting shaft by reason of a back fire in the engine, the clutch section G' will slip back past the clutch section H' and no harm will result from the back fire.

It will be noticed that the ratchet J and its pawl K are housed in a bracket L secured at L' to the dash M of the automobile and this bracket L also forms a boxing or bearing for the starting shaft in the use of the invention.

In the use of the invention, it will be noticed that the handle B' is not at any time an element of danger to the operator, although it may be retained permanently in position immediately in rear of the dash and in convenient reach of the operator so that he can, without leaving his seat, turn the shaft B to start the engine. When the engine is operating, the ratchet C will slip forward past the pawl D' and there will be no operation whatever of the sprocket chain or of the starting shaft and the parts immediately associated therewith. If, on the other hand, a back fire should occur, the reverse motion is stopped at the clutch section H', which will slip back against the tension of its spring I when the clutch section G' is turned in the reverse direction, the starting shaft being located as against reverse movement by the detent devices J and K, more fully described hereinbefore.

It will be noticed from the foregoing that my invention includes in connection with the engine shaft, a starting shaft and gearing between the engine shaft and starting shaft, which gearing includes ratchet devices immediately associated with the engine shaft, slip clutch devices in connection with the starting shaft and detent mechanism for preventing any reverse movement of the starting shaft in order to avoid any injury to the operator in case of a back fire.

I claim:

The improvement in starting devices for automobiles, substantially as herein described, comprising in combination, an engine shaft, a ratchet wheel fast thereon, a sprocket wheel forming a housing for the ratchet wheel and provided with a pawl engaging the ratchet wheel, a starting shaft, a sprocket wheel loose on the starting shaft and provided with a slip clutch section, a slip clutch section keyed to and movable along the starting shaft, a spring pressing such clutch sections normally into engagement with each other, a chain connecting the sprocket wheels of the engine shaft and starting shaft and detent mechanism for preventing reverse motion of the starting shaft, substantially as set forth.

JOHN P. PETIT.

Witnesses:
 SOLON C. KEMON,
 PERRY B. TURPIN.